(12) United States Patent
Hou et al.

(10) Patent No.: US 9,085,290 B2
(45) Date of Patent: Jul. 21, 2015

(54) HOVERCRAFT WITHOUT LIFT FAN

(71) Applicant: CHONGQING YUNHAN MARINE TECHNOLOGY CO., LTD, Chongqing (CN)

(72) Inventors: Liang Hou, Chongqing (CN); Fengqin Jia, Chongqing (CN); Yuhan Hou, Chongqing (CN)

(73) Assignee: CHONGQING YUNHAN MARINE TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 14/361,302

(22) PCT Filed: May 16, 2013

(86) PCT No.: PCT/CN2013/075750
§ 371 (c)(1),
(2) Date: May 29, 2014

(87) PCT Pub. No.: WO2013/178018
PCT Pub. Date: Dec. 5, 2013

(65) Prior Publication Data
US 2014/0353059 A1    Dec. 4, 2014

(30) Foreign Application Priority Data

May 29, 2012  (CN) ............ 2012 1 0170599
May 29, 2012  (CN) ............ 2012 2 0245847 U

(51) Int. Cl.
| | | |
|---|---|---|
| B63B 1/38 | (2006.01) |
| B63H 7/00 | (2006.01) |
| B60V 1/04 | (2006.01) |
| B63B 1/10 | (2006.01) |
| B60V 1/08 | (2006.01) |
| B60V 1/14 | (2006.01) |
| B60V 3/06 | (2006.01) |
| B63B 1/04 | (2006.01) |
| B63B 1/12 | (2006.01) |
| B63B 1/20 | (2006.01) |

(52) U.S. Cl.
CPC ... B60V 1/04 (2013.01); B60V 1/08 (2013.01); B60V 1/145 (2013.01); B60V 3/065 (2013.01); B63B 1/042 (2013.01); B63B 1/10 (2013.01); B63B 1/125 (2013.01); B63B 1/20 (2013.01)

(58) Field of Classification Search
USPC .............. 440/37; 114/271, 274, 67 R, 67 A
IPC ............ B63B 2001/204,1/18; Y02T 70/122
See application file for complete search history.

(56) References Cited

U.S. PATENT DOCUMENTS 3,094,962 A  *  6/1963  Goar ............ 114/271
4,091,761 A  *  5/1978  Fehn ............ 114/290
4,862,817 A  *  9/1989  Hornsby et al. ...... 114/67 A (Continued)

*Primary Examiner* — Stephen Avila

(57) ABSTRACT

A hovercraft without lift fan includes: a hull; and a power device; wherein the hull includes: a main body; and two sub-bodies; wherein bottom surfaces of the sub-bodies are lower than a bottom surface of the main body, the two sub-bodies are symmetrically aligned under a front portion of the bottom surface of the main body, the two sub-bodies are provided with a distance therebetween; an outer surface of the sub-body and an outer surface of the main body form an aligned side surface or an unified side surface; the aligned side surface or the unified side surface extends towards a space under the bottom surfaces of the main body and the sub-bodies for forming a main sidewall; an inner side surface of the sub-body extends towards a space under the bottom surface of the sub-body for forming a sub-sidewall.

7 Claims, 4 Drawing Sheets

(56) References Cited

U.S. PATENT DOCUMENTS 5,570,650 A * 11/1996 Harley .................. 114/61.2
6,066,012 A * 5/2000 Nagle ............................ 440/75
7,654,211 B2 * 2/2010 Maloney et al. ............ 114/67 R

* cited by examiner air cushion area under hull

US 9,085,290 B2

HOVERCRAFT WITHOUT LIFT FAN

CROSS REFERENCE OF RELATED APPLICATION

This is a U.S. National Stage under 35 U.S.C. 371 of the International Application PCT/CN2013/075750, filed May 16, 2013, which claims priority under 35 U.S.C. 119(a-d) to CN 201220245847.2, filed May 29, 2012, and CN 201210170599.4, filed May 29, 2012.

BACKGROUND OF THE PRESENT INVENTION

1. Field of Invention

The present invention relates to ships or other watercrafts, and more particularly to a high-speed watercraft with low sailing resistance, high propulsion efficiency and high speed, and also to a hovercraft without lift fan, whose stability is sufficient, load capability is large and energy consumption is low.

2. Description of Related Arts

The conventional hovercraft mainly relies on the effect of lift fans for forming a high-pressure air cushion under the bottom, in such a manner that the hull is lifted above the water, and the resistance of water when sailing is greatly reduced. Not only the sailing speed is high, but also adaptability is sufficient. However, because both the lifting device and the driving device are needed, the conventional hovercraft when sailing consumes a large amount of lifting power, even above 50% of the total power, which increases a manufacture cost of the conventional hovercraft, as well as lowers operation economy.

PCT/2011/079078 disclosed a sidewall planing boat, which is a previous application of the inventor of the present invention. The ship has a parallel trimaran structure. Sub-bodies of the boat are mounted on a front portion of a body and are provided at two sides of the body. And continuous rigid sidewalls are mounted at sides of the boat. Bottom surfaces of the sub-bodies are lower than a bottom surface of the body, whereby an angle is formed between the bottom surface and a water surface. Therefore, during high-speed sailing, air in front of the boat is pressed into a lifting area under the boat for forming three air cushions, in such a manner that the hull is lifted above the water. The boat according to the previous application not only lowers the water resistance and archives a high speed, but also excludes lift fans and lowers power consumption. Therefore, the technical effect is sufficient. However, the boat according to the previous application still has disadvantages as follows. On one hand, an upper space of the sub-body is not occupied, which narrows a passenger cabin on the hull and affects application of the boat. On the other hand, because the three air cushions formed under the hull are separated from each other, a total width and a total area of the air cushions are decreased, whereby the load capability and stability of the whole hull are insufficient.

SUMMARY OF THE PRESENT INVENTION

An object of the present invention is to provide a hovercraft, wherein a lift fan is omitted by special structure design of the hovercraft. However, when sailing, a bottom portion of the hovercraft takes full advantage of ram air principles for forming a high-pressure air cushion and supporting a hull above water, in such a manner that low sail resistance, high propulsion efficiency and high speed is archived.

Accordingly, in order to accomplish the above object, the present invention provides a hovercraft without lift fan, comprising:
a hull; and
a power device;
wherein the hull comprises:
a main body; and
two sub-bodies, wherein bottom surfaces of the sub-bodies are lower than a bottom surface of the main body;
wherein the two sub-bodies are symmetrically aligned under a front portion of the bottom surface of the main body, the two sub-bodies are provided with a distance therebetween; an outer surface of the sub-body and an outer surface of the main body form an aligned side surface or an unified side surface; the aligned side surface or the unified side surface extends towards a space under the bottom surfaces of the main body and the sub-bodies for forming a main sidewall; an inner side surface of the sub-body extends towards a space under the bottom surface of the sub-body for forming a sub-sidewall;
wherein during sailing, the main sidewalls and the sub-sidewalls are partly immersed in water and respectively form three independent lifting areas having forward openings with the bottom surface of the main body and the bottom surfaces of the sub-bodies.

Preferably, the bottom surface of the main body and the bottom surfaces of the sub-bodies are flat and are parallel to each other.

Preferably, shapes and sizes of the sub-bodies are the same, lengths thereof are of a half length of the main body, a sum of widths thereof is of a half width of the main body.

Preferably, the main sidewalls are longitudinally continuous flat plates parallel to each other; the sub-sidewalls are also longitudinally continuous flat plates parallel to each other; the sidewalls are parallel to the sub-sidewalls.

Preferably, a rigid fin keel is mounted on a middle of a rear portion of the bottom surface of the main body, the rigid fin keel is longitudinally continuous and is vertically inserted into the water.

Preferably, a front portion of the bottom surface of the main body and front portions of the bottom surfaces of the sub-bodies are raised up for forming forerake bow portions.

Preferably, bow portion positions of the sub-bodies protrude forward from a bow portion position of the main body.

Preferably, the power device comprises water propellers mounted on a rear portion of the main body.

Preferably, the power device comprises air propellers mounted on a top portion of the main body.

According to a preferred embodiment of the present invention, the sub-bodies are mounted under the main body, which effectively increases a loading space and a loading area of the main body, whereby a space of a passenger cabin according to the present invention is doubled for solving insufficient utilization of a space of the sub-bodies, and thus the space of the passenger cabin is doubled.

At the meantime, the sub-bodies are mounted under the front portion of the bottom surface of the main body, and the bottom surfaces of the sub-bodies are lower than the bottom surface of main body. Therefore, the front portion of the main body is lifted, and a lifting angle of a is formed between the bottom surface and the water surface. During sailing, air in front of the hovercraft is pressed into the lifting area under the hovercraft for forming the high-pressure air cushions. With the foregoing structure, the low sailing resistance of the hovercraft and the high sailing speed are still able to be archived without the high-consumption lifting fan.

Furthermore, difference between the present invention and the sidewall planing boat in the inventor's previous application is: the main sidewall is at an outer side of the sub-sidewall and covers the sub-sidewall for unifying the three independent lifting areas and doubling the area of the air cushion, in such a manner that the load capability is significantly increased.

According to experience results, the stability and the load capability of the hovercraft without the lifting fan are doubled, and anti-wave, maneuverability and speed indexes thereof are also excellent.

These and other objectives, features, and advantages of the present invention will become apparent from the following detailed description, the accompanying drawings, and the appended claims.

BRIEF DESCRIPTION OF THE DRAWINGS

Referring to the drawings, the present invention is further illustrated according to preferred embodiments which are not intended to be limiting.

Figure 1:
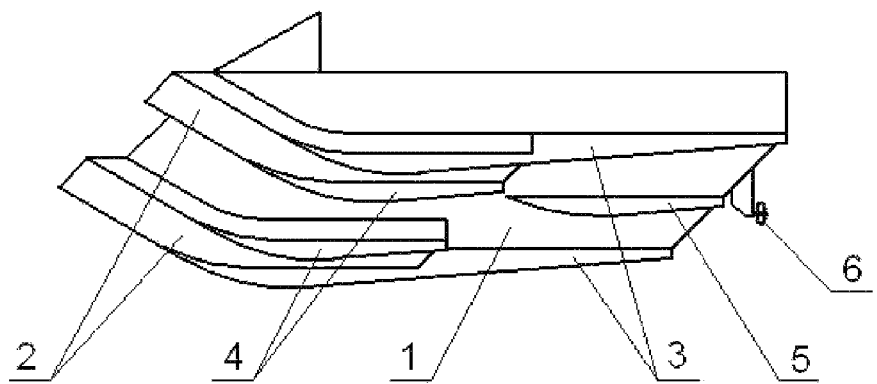
FIG. 1 is a perspective view of a hull according to a preferred embodiment of the present invention.

Reference Numbers Of Elements: 1—main body, 2—sub-body, 3—main sidewall, 4—sub-sidewall, 5—fin keel, 6—water propeller, 7—air propeller.

DETAILED DESCRIPTION OF THE PREFERRED EMBODIMENT

Referring to the drawings, a hovercraft without lifting fan according to a preferred embodiment of the present invention is illustrated, comprising:
a hull; and
a power device;
wherein the hull comprises:
a main body 1; and
two sub-bodies 2, wherein bottom surfaces of the sub-bodies are lower than a bottom surface of the main body;
wherein the two sub-bodies 2 are symmetrically aligned under a front portion of the bottom surface of the main body 1, the two sub-bodies 2 are provided with a distance therebetween; an outer surface of the sub-body 2 and an outer surface of the main body 1 form an aligned side surface or an unified side surface; the aligned side surface or the unified side surface extends towards a space under the bottom surfaces of the main body 1 and the sub-bodies 2 for forming a main sidewall 3; an inner side surface of the sub-body 2 extends towards a space under the bottom surface of the sub-body 2 for forming a sub-sidewall 4;
wherein during sailing, the main sidewalls 3 and the sub-sidewalls 4 are partly immersed in water and respectively form three independent lifting areas having forward openings with the bottom surface of the main body 1 and the bottom surfaces of the sub-bodies 2.

Figure 2:
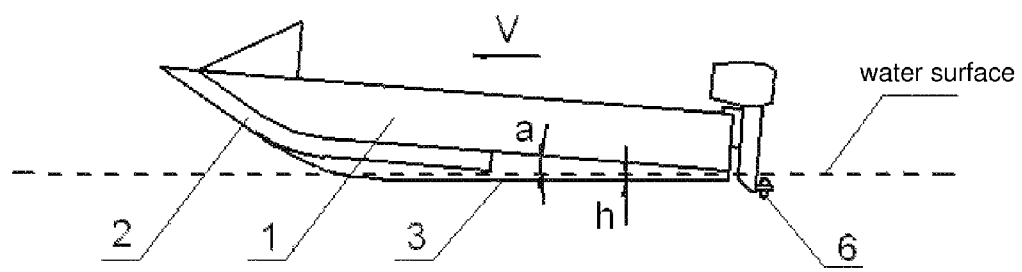
FIG. 2 is a sketch view of a sailing state according to the preferred embodiment of the present invention.
Figure 3:
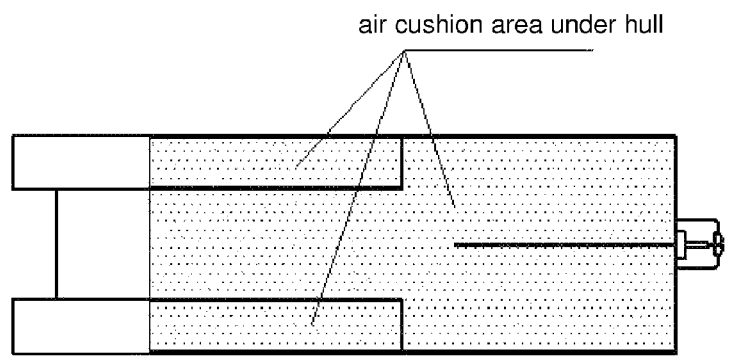
FIG. 3 is a bottom view of air cushions under the hovercraft according to the preferred embodiment of the present invention.
Figure 4:
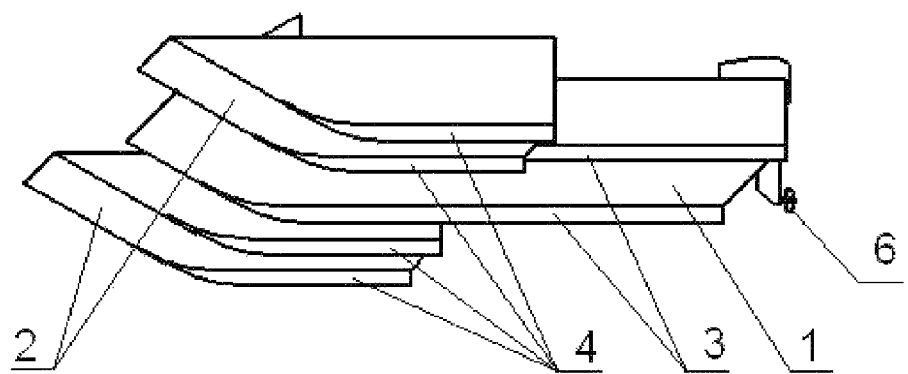
FIG. 4 is a perspective view of a sidewall planing boat in the inventor's previous application.
Figure 5:
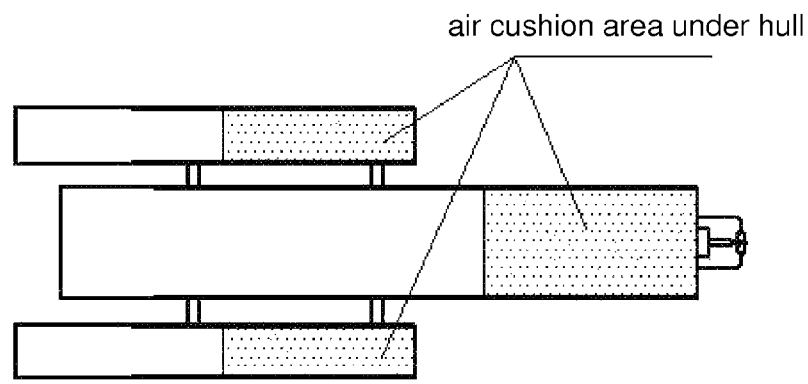
FIG. 5 is a bottom view of air cushions of the sidewall planing boat in the inventor's previous application.
Figure 6:
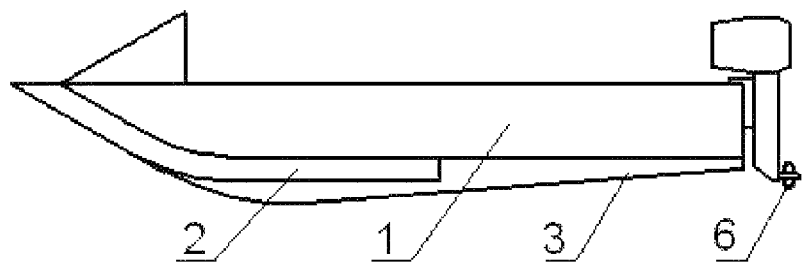
FIG. 6 is a right view of the hovercraft utilizing water propellers according to the preferred embodiment of the present invention.
Figure 7:
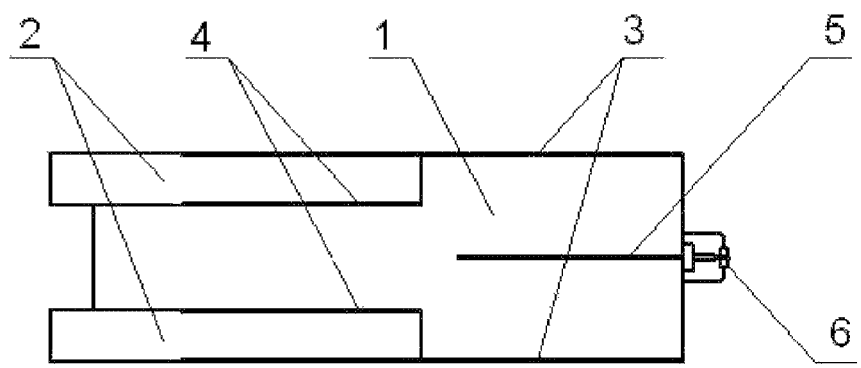
FIG. 7 is a bottom view of the hovercraft utilizing the water propellers according to the preferred embodiment of the present invention.
Figure 8:
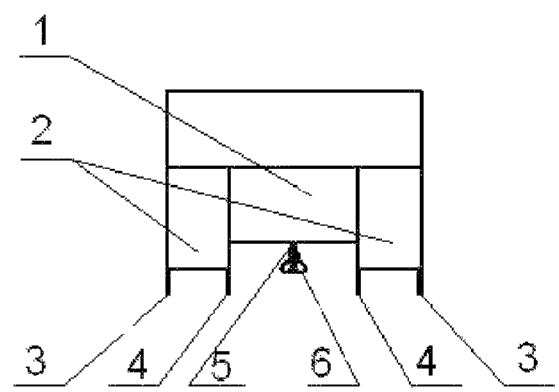
FIG. 8 is a rear view of the hovercraft utilizing the water propellers according to the preferred embodiment of the present invention.
Figure 9:
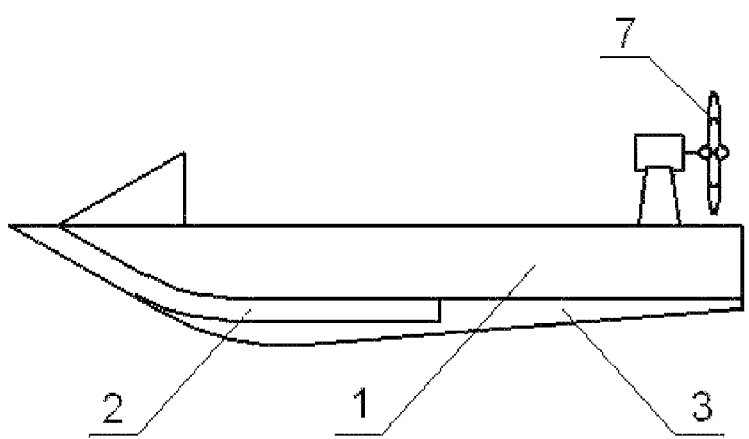
FIG. 9 is a right view of the hovercraft utilizing air propellers according to another preferred embodiment of the present invention.
Figure 10:
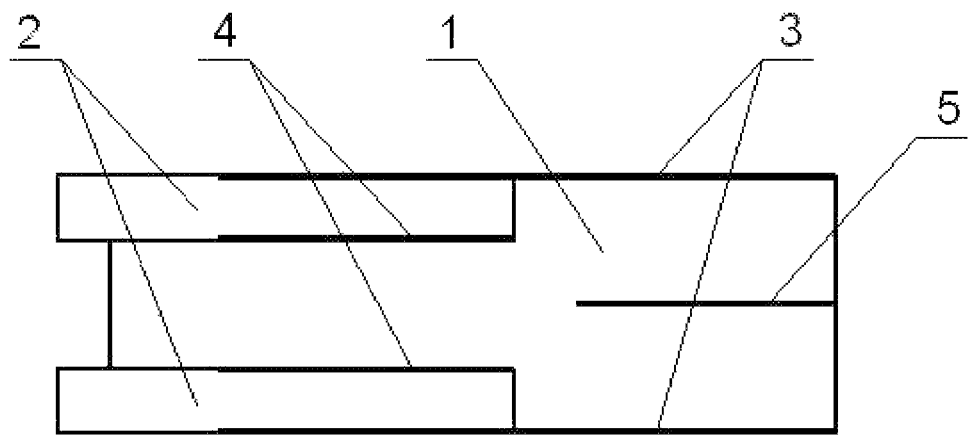
FIG. 10 is a bottom view of the hovercraft utilizing the air propellers according to the preferred embodiment of the present invention.
Figure 11:
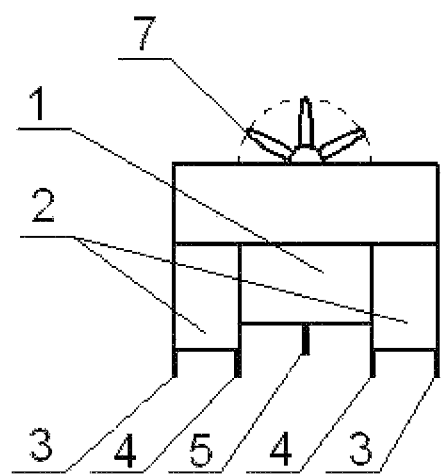
FIG. 11 is a rear view of the hovercraft utilizing the air propellers according to the preferred embodiment of the present invention.

Referring to the FIG. 1 and the FIG. 4 of the drawings, the hull according to the present invention and a sidewall planing boat are respectively illustrated. According to the present invention, a space of the main body 1 comprises a space above the sub-body 2, in such a manner that a total space above the hull is effectively enlarged. Therefore, with a same size, load capability of the main body 1 is doubled. In fact, the structure according to the present invention is more effective. Referring to the FIG. 2 of the drawing, when sailing with a speed of V, the sub-bodies 2 lift the main body 1 from the front portion thereof, and an lifting angle of a is formed between the bottom surface and the water surface. At the moment, air is pressed to the bottom of the hovercraft, and sidewalls at the two sides are inserted into the water for preventing the air under the hull from leaking, in such a manner that the air in the lifting area under the hull is compressed for forming high-pressure air cushions and realizing an air cushion effect of conventional hovercrafts.

By adjusting a height difference of the bottom surface of the sub-body 2 and the bottom surface of the main body 1, different lifting angles of a are able to be provided. Basically, the lifting angle of a is controlled within 1~8°. Preferably, when the lifting angle of a is within 3~5°, the air cushions formed are the best.

By modifying a bottom edge of the main sidewall 3 and a bottom edge of the sub-sidewall 4 for forming angles equal to the lifting angle of a with the bottom of the hull, the bottom edges of the sidewalls are parallel to the water surface during sailing, in such a manner that the sailing resistance on the sidewalls is decreased, and air tightness is improved.

According to another preferred embodiment, the bottom surface of the main body 1 and the bottom surfaces of the sub-bodies 2 are flat and are parallel to each other. With the foregoing structure, startup performance of the hovercraft is improved. That is to say, when the hovercraft is during startup and the air cushion is not formed, the three bodies provide a technique effect of an aquaplane, which decreases the water resistance on the hull and balances dynamic water pressure on the bottom surfaces of the hull, in such a manner that the hull is able to enter an air cushion sailing state more quickly.

According to the preferred embodiment, shapes and sizes of the sub-bodies 2 are the same, lengths thereof are of a half length of the main body 1, a sum of widths thereof is of a half width of the main body 1. As a result, the lifting areas under the sub-bodies 2 are symmetrically provided at two sides of the lifting area under the main body 1, in such a manner that gesture and stability of the hovercraft during sailing are improved.

According to the preferred embodiment, the main sidewalls 3 are longitudinally continuous flat plates parallel to each other; the sub-sidewalls 4 are also longitudinally continuous flat plates parallel to each other; the sidewalls are parallel to the sub-sidewalls. As a result, when the sidewalls are inserted into the water, the sailing resistance is decreased.

According to the preferred embodiment, a rigid fin keel 5 is mounted on a middle of a rear portion of the bottom surface of the main body 1, the rigid fin keel 5 is longitudinally continuous and is vertically inserted into the water. The rigid fin keel 5 evenly divides the lifting area under the main body 1 into two parts, for dividing the three independent air cushions into four independent air cushions, and changing a three-leg support state to a four-leg support state, in such a manner that the stability during high-speed sailing is more sufficient.

According to the preferred embodiment, advantages of the sidewall planing boat are kept, wherein a front portion of the bottom surface of the main body 1 and front portions of the bottom surfaces of the sub-bodies 2 are raised up for forming forerake bow portions; and bow portion positions of the sub-bodies 2 protrude forward from a bow portion position of the main body 1. With the foregoing structure, during sailing, the air is pressed to the bottom of the hovercraft more smoothly for rapidly and effectively forming the high-pressure air cushions under the hull, in such a manner that the hull is lifted above the water surface and the resistance is decreased.

According to the present invention, a various kinds of the power devices are applicable. According to the preferred embodiments, two kinds of the power devices are respectively utilized. Installation methods and installation positions thereof are illustrated in the preferred embodiments, which are not intended to be limiting. The power device comprises water propellers 6 mounted on a rear portion of the main body 1. Or, the power device comprises air propellers 7 mounted on a top portion of the main body 1. Certainly, the power device may comprise a hydraulic propeller or a jet propeller, which will not be listed in detail.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hovercraft without lift fan, comprising:
a hull; and
a power device;
wherein said hull comprises:
a main body; and
two sub-bodies, wherein bottom surfaces of said sub-bodies are lower than a bottom surface of said main body,
wherein said two sub-bodies are symmetrically aligned under a front portion of said bottom surface of said main body, said two sub-bodies are provided with a distance therebetween; an outer surface of said sub-body and an outer surface of said main body form an aligned side surface or an unified side surface; said aligned side surface or said unified side surface extends towards a space under said bottom surfaces of said main body and said sub-bodies for forming a main sidewall; an inner side surface of said sub-body extends towards a space under said bottom surface of said sub-body for forming a sub-sidewall;
wherein during sailing, said main sidewalls and said sub-sidewalls are partly immersed in water and respectively form three independent lifting areas having forward openings with said bottom surface of said main body and said bottom surfaces of said sub-bodies;
wherein said bottom surface of said main body and said bottom surfaces of said sub-bodies are flat and are parallel to each other;
wherein said main sidewalls are longitudinally continuous flat plates parallel to each other; said sub-sidewalls are also longitudinally continuous flat plates parallel to each other; said sidewalls are parallel to said sub-sidewalls.

2. The hovercraft, as recited in claim 1, wherein shapes and sizes of said sub-bodies are the same, lengths thereof are of a half length of said main body, a sum of widths thereof is of a half width of said main body.

3. The hovercraft, as recited in claim 1, wherein a rigid fin keel is mounted on a middle of a rear portion of said bottom surface of said main body, said rigid fin keel is longitudinally continuous and is vertically inserted into the water.

4. The hovercraft, as recited in claim 1, wherein a front portion of said bottom surface of said main body and front portions of said bottom surfaces of said sub-bodies are raised up for forming forerake bow portions.

5. The hovercraft, as recited in claim 1, wherein bow portion positions of said sub-bodies protrude forward from a bow portion position of said main body.

6. The hovercraft, as recited in claim 1, wherein said power device comprises water propellers mounted on a rear portion of said main body.

7. The hovercraft, as recited in claim 1, wherein said power device comprises air propellers mounted on a top portion of said main body.

* * * * *